INVENTOR.
RICHARD A. CHURCH
BORIS W. HARITONOFF
BY *Herman Seid*
ATTORNEY.

Aug. 4, 1964    R. A. CHURCH ETAL    3,143,292
AIR DISTRIBUTING UNITS
Filed June 30, 1959    2 Sheets-Sheet 2

*INVENTOR.*
RICHARD A. CHURCH
*BY* BORIS W. HARITONOFF

ATTORNEY.

3,143,292
Patented Aug. 4, 1964

3,143,292
AIR DISTRIBUTING UNITS
Richard A. Church, North Syracuse, and Boris W. Haritonoff, Syracuse, N.Y., assignors to Carrier Corporation, Syracuse, N.Y., a corporation of Delaware
Filed June 30, 1959, Ser. No. 823,907
7 Claims. (Cl. 236—49)

This invention relates to air distributing units and, more particularly, to an air distributing unit incorporating a damper and a control therefor and to a method for controlling a damper in an air distributing unit.

In copending application, Serial No. 824,053 filed June 30, 1959, now Patent No. 3,082,676, in the names of Richard A. Church, Joseph Blanchette and James H. Paris, entitled "Air Distributing Unit," there is disclosed an air conditioning system including an air distributing unit for the interior zones of buildings. As stated therein, these interior zones have heretofore been considered as constant load areas. In reality, minor changes in load occur, frequently resulting in inadequate air conditioning of such zones.

The present invention is concerned with a unit of the type described in the copending application above referred to which incorporates suitable control means to utilize plenum chamber pressure or other suitable pressure sources such as conduit pressure to actuate the control to maintain a substantially constant volumetric discharge from the air distributing unit. The invention also involves the use in the control of temperature-responsive means for varying the volumetric discharge from the outlet of the unit in response to variation in temperature within the area to be treated. It will be appreciated that in use the control is set to maintain a substantially constant maximum discharge from the unit and that the temperature-responsive means serves to reduce the quantity of air discharged from the unit in response to temperature conditions within the area being treated.

The chief object of the present invention is to provide an air distributing unit including damper means and controls therefor to regulate air discharge in accordance with load conditions in an area to be treated.

An object of the invention is to provide an air distributing unit including damper means which may be actuated in response to pressure of the fluid being supplied to the unit and control means for maintaining substantially constant the volumetric discharge from the unit while compensating for changes in pressure of the fluid being supplied to the unit.

A further object is to provide an improved control for a bladder damper.

A still further object is to provide an air distributing unit including a bladder damper which is actuated by the pressure of air being supplied to the unit and includes a control for maintaining the volumetric discharge from the unit substantially constant.

A further object is to provide a method of operating a bladder damper in an air distributing unit. Other objects of the invention will be more readily perceived from the following description.

This invention relates to an air distributing unit for supplying conditioned air to an area to be treated and comprises a plenum chamber, means for supplying air at a predetermined pressure to said plenum chamber, means defining an outlet from said plenum chamber into the area to be treated, damper means associated with said outlet, said damper means including a control chamber, means for supplying a pressure less than plenum pressure to the control chamber and means responsive to variation in a predetermined air pressure to vary control chamber pressure thereby actuating the damper to maintain a substantially constant volumetric discharge through said outlet.

This invention also relates to a method of regulating the discharge of air from an air conditioning unit including a plenum chamber having an outlet and a bladder damper arrangement to regulate discharge of air through the outlet in which the steps consist of supplying air to the plenum chamber at a predetermined pressure, supplying air to the damper arrangement at a predetermined pressure less than the pressure within the plenum chamber and controlling the pressure within the damper arrangement in response to variation in supply air pressure to actuate the damper arrangement to maintain a substantially constant volumetric discharge through the outlet.

The attached drawing illustrates a preferred embodiment of the invention in which.

Figure 1:
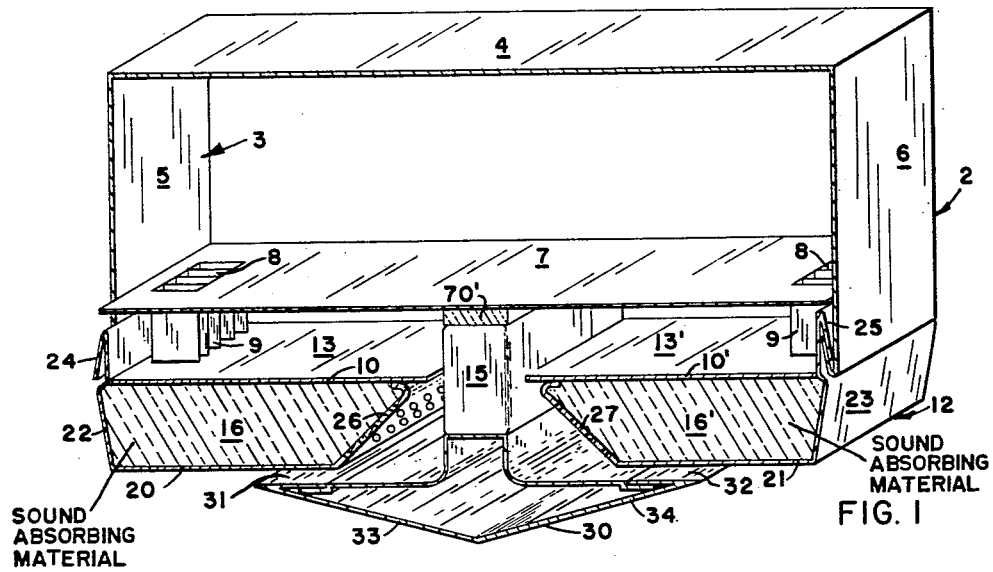
FIGURE 1 is a sectional view illustrating the air distributing unit.
Figure 2:
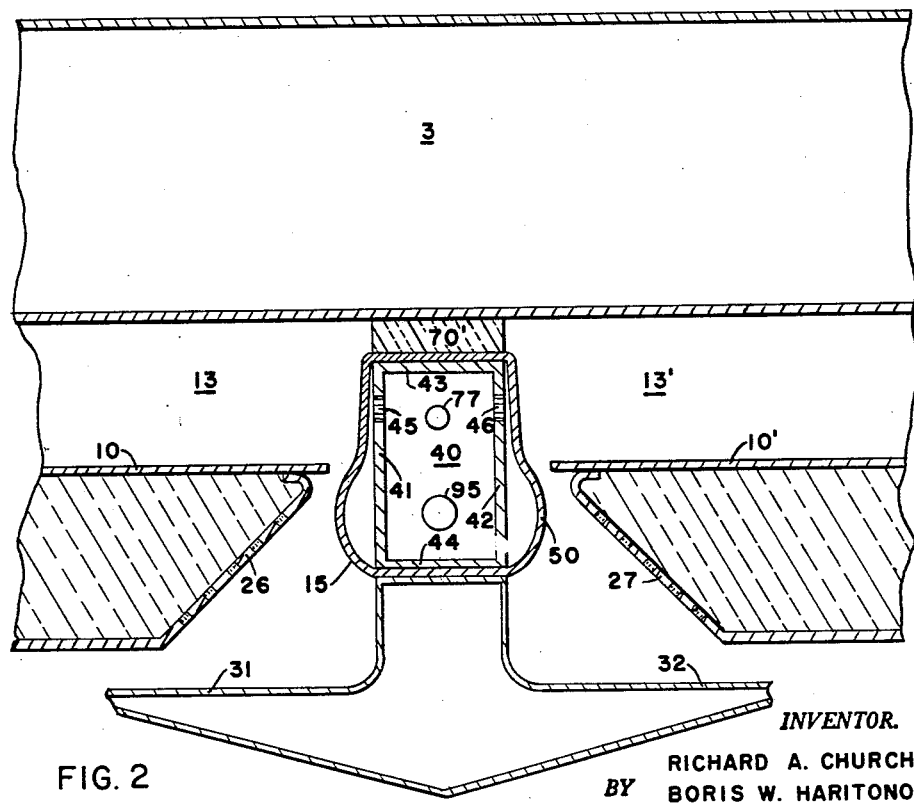
FIGURE 2 is an enlarged sectional view of the bladder damper.

Referring to the drawings, FIGURES 1 and 2 disclose a sectional view of the unit 2. This unit includes a conduit section 3 which is defined by the top wall 4 and the side walls 5 and 6. The conduit section 3 has a lower wall 7 which separates the conduit section from the air distributing section 12.

The air distributing section 12 comprises the plenums 13 and 13' which are located on opposite sides of a bladder damper 15. The plenum 13 is defined by the extension of wall 22, wall 7 and the lower wall 10. Similarly, the plenum 13' is defined by the wall 7, the extension of the wall 23 and lower wall 10'. In order to pass conditioned air from the conduit section 3 into the plenums 13, 13', suitable openings 8 are spaced along the edges of the wall 7 adjacent the junctures of the wall 7 with the walls 5 and 6. Associated with these openings 8 are a plurality of deflecting vanes 9 which extend into the plenums 13 and 13'. These vanes perform a diffusing action and substantially remove the velocity components from the air in the conduit 3 and convert it substantially to static pressure within the plenums 13 and 13'. It will be appreciated these vanes may be omitted, if desired.

The air is discharged from the plenums 13 and 13' through the longitudinal openings defined by the edges of the walls 10 and 10' and the opposite edges defined by the bladder damper 15. This bladder damper will be described more fully hereinafter.

As the air passes from each of the plenums, the air is expanded adjacent the angular walls 26 and 27. These walls may be suitably perforated, placing the discharge side of the longitudinal orifices from the plenums into communication with the silencing chambers 16 and 16'. The chamber 16 is defined by the walls 10, 22, 20, and the perforated section 26. The second silencing chamber 16' is defined by the walls 10', 23, 21, and the perforated section 27. These chambers may be filled with suitable sound-absorbing material such as glass wool.

The bladder damper 15 may be connected to the wall 7 by means of a suitable filler piece 70' to maintain separate plenums 13, 13'. It will be appreciated, of course, a single plenum may be provided, if desired, for certain applications instead of separated plenums. A suitable deflector 30 may be suspended from the lower portion of the bladder damper 15 to deflect the air discharged from the respective plenums in a general horizontal direction substantially parallel to the walls 20 and 21. These deflectors normally consist of two surfaces 31 and 32 which perform a turning function and also provide two longitudinal slots. For the purpose of maintaining low noise levels, these surfaces 31 and 32 are normally flocked. The lower portion of the deflector comprises two angularly disposed planar surfaces 33 and 34.

Very often it is desired that these units be continuous throughout the length of an area. In other situations it may be desirable to separate these units. For this reason, the conduit section 3 is usually supplied in a three-sided construction with the open lower end being provided with bent sections (not shown). These bends extend toward the interior of the conduit and are intended to either fit closing members or to engage the bent portions of the air distributing sections 12, especially the walls 22 and 23 thereof which have outwardly bent portions 24 and 25 adapted to engage the conduit section 3.

Referring to FIGURE 2, there is shown an enlarged view of the damper with a control which may be utilized therewith. It will be noted that the walls 10 and 10' which define the lower portion of the plenum extend beyond the juncture point with the walls 26 and 27. These edges form sealing edges adapted to coact with the bladder damper to throttle the air passing from the plenum. The bladder damper includes a chamber 40 which has a generally parallelepiped shape defined by the walls 41, 42, 43 and 44. Covering these walls which form the chamber 40 is a suitable fabric envelope 50 which comprises the bladder of the damper. The fabric may consist of a cloth impregnated with a suitable elastomer material such as nylon fabric coated or impregnated with neoprene or a polymerized butadiene.

To actuate the bladder to cooperate with the edges of the walls 10 and 10', suitable openings 45 and 46 are spaced in the walls 41 and 42. These openings are located in the upper portion of the chamber 40, specifically in the portion of the bladder damper which extends into and at least partially define wall portions of the plenums 13 and 13'. It is intended that a control pressure be introduced into the control chamber 40, this control pressure being a pressure less than the pressure existing within the conduit 3 and the plenums 13 and 13'. It is intended that this lesser pressure exist in the control chamber so that the control fluid will pass through the openings 45 and 46 and be metered between the bladder 50 and the surfaces 41 and 42 adjacent the openings 45 and 46.

In physically providing the ports 45 and 46, it should be done in a manner so as not to provide positive sealing surfaces between the wall sections 41 and 42 which lie adjacent these ports, for it is intended that the fluid passing from the chamber 40 be able to pass toward the lower portion of the damper in such a manner as to permit restricted deflation and inflation of the lower portion of the damper in a manner to be described hereinafter.

Because the plenum is at a higher pressure than the pressure within the chamber 40, the upper portion of the bladder will be urged in substantial surface contact with the surfaces 41 and 42. However, as the air passes through the longitudinal openings defined by the edges of the walls 10 and 10' and the bladder damper, the air will be expanded thereby decreasing its pressure. The lower portion of the bladder damper will be at a higher pressure than the adjacent air causing the lower portion of the bladder to inflate. This inflated bladder will cooperate with the edges of the walls 10 and 10' throttling the air passing from the plenums 13 and 13'.

It will be appreciated that because of the particular construction of the bladder and the inherent metering function performed by the bladder coacting with the area adjacent ports 45 and 46, air may be metered into the lower portion of the bladder providing stability in operation and avoiding the common defect of bladder dampers, namely, a fluttering action. This fluttering action which is normally experienced in bladder dampers contributes to poor control and also excessive noise resulting in making the damper inadequate for use.

Figure 3:
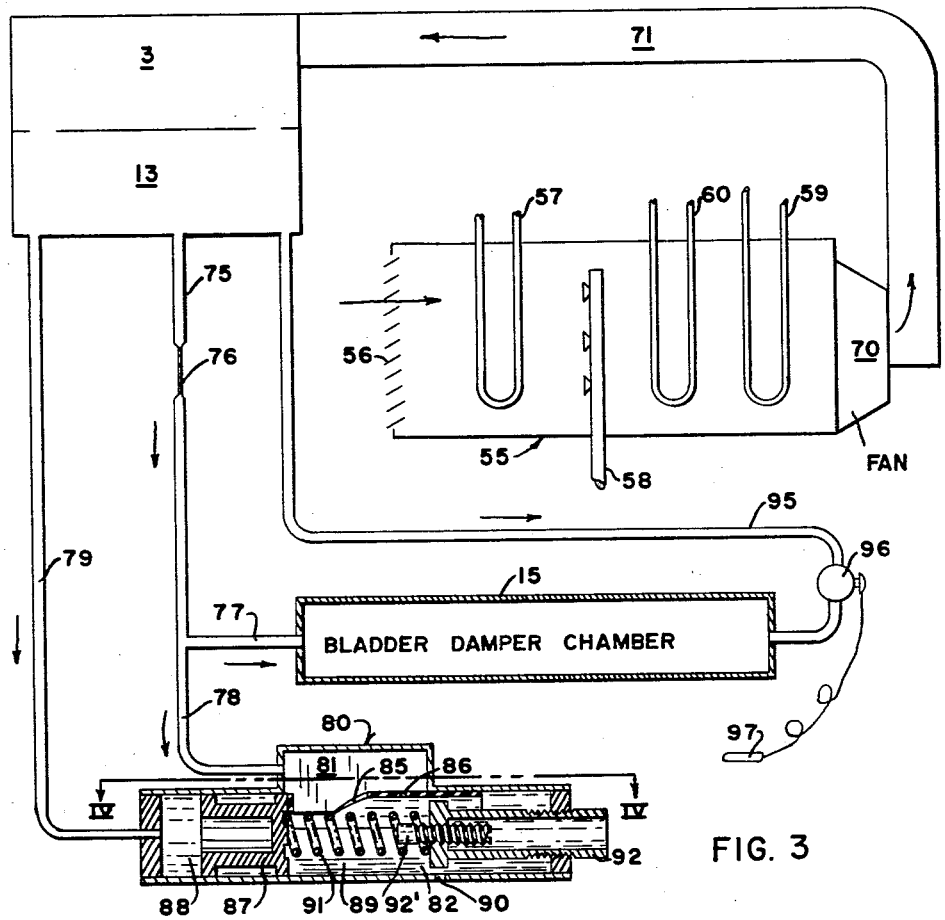
FIGURE 3 is a view, partly in section and partly diagrammatic, of the control system including the pressure-responsive valve of the control.
Figure 4:
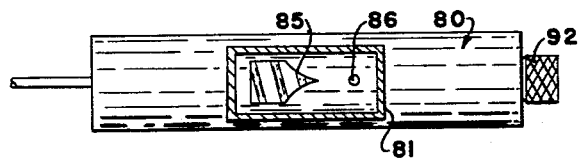
FIGURE 4 is a view, partly in plan and partly in section, of the pressure-responsive valve.

Referring to FIGURE 3 there is shown a diagrammatic view of the control for the damper shown in FIGURES 1 and 2. The pressure-responsive valve is shown in section and a plan view of this valve is shown in FIGURE 4.

Air is supplied to the unit 2 from a central station 55. This central station includes suitable louvered openings 56 for permitting air to enter the station, heat exchange means such as the cooling coil 57, spray header 58, heating coil 59 and cooling coil 60. The air is induced through the central station by means of the fan 70 which discharges into the conduit 71.

In FIGURE 3 this conduit 71 discharges into the conduit 3 and plenum chamber 13, which is the plenum chamber shown in FIGURES 1 and 2.

The line 75 extends from the plenum 13 and is connected by means of the line 77 to the parallelepiped member which comprises the control fluid chamber of the bladder damper 15. Located in this line 75 is a suitable constriction 76 which may be an orifice or a capillary tube. Also connected to the line 75 is a suitable line 78 which is connected to the pressure-regulating valve 80. It will be appreciated if vanes 9 are employed, line 75 may be connected to conduit 3; preferably, when vanes 9 are omitted line 75 connects plenum 13 to the control chamber, as described.

A line 79 also extends from the plenum chamber 13 and is connected to pressure-regulating valve 80. The pressure-regulating valve 80 comprises means defining a first chamber 81. This chamber 81 is connected to the line 78. The valve 80 also includes a cylindrical chamber 82 which is connected to the first chamber 81 by means of the orifices 85 and 86. The orifice 85 has a general arrowhead shape whereas the orifice 86 has a circular shape. A piston 87 is reciprocatingly mounted within the chamber 82 and divides this chamber 82 into a first portion 88 and a second portion 89. The orifices 85 and 86 place the chamber 81 into communication with the second portion 89 of the cylindrical chamber 82. The first portion 88 of the chamber 82 is connected to the line 79 which, as previously mentioned, is in communication with the plenum chamber 13.

Since the pressure in the first portion 88 is at a greater level than in the second portion 82, suitable biasing means are provided to restore the piston 87 to another position in the event that the pressure in the first portion diminishes. This is achieved by a suitable spring 91 which is located in the second portion 89 and urges the piston 87 in a direction toward the connection of the line 79 into the cylindrical chamber 82.

The bias on this piston may be varied by suitable adjustment of the calibrating screw 92 which is in threaded engagement with the end portion of the chamber 82.

The function of the piston 87 is to diminish the area of the orifice 85 by its reciprocating motion which tends to close the opening in response to an increased pressure within the first portion 88 of the chamber 82. If desired, an orifice 86 may be provided to establish fixed minimum discharge between the chamber 81 and the second portion 89 of the chamber 82.

It is also noted that a line 95 extends from the plenum 13 to the damper 15 and a suitable thermostatic-responsive element 97 located in the area to be treated is connected to a control valve 96 in the line 95 to regulate the amount of air supplied through the line 95 in response to temperature conditions within the area to be treated. As pointed out above, generally cooled air is supplied to the unit so that valve 96 in effect serves to reduce the quantity of air discharged from the unit. Other temperature-responsive controls may, of course, be employed.

Considering the operation of the control described in FIGURES 3 and 4, air is introduced into the central station 55 through the louvers 56. In the central station 55 the air may be selectively treated by any of the elements 57, 58, 59 and 60. By this means the temperature and humidity of the air may be maintained within desired limits. The air is discharged from the central station 55 by the fan 70 which discharges the conditioned air through the conduit 71 to conduit 3, the air passing through openings 8 into the plenum chamber 13 and a portion of this air which is not passed through the outlet of the unit shown in FIGURES 1 and 2, is utilized to actuate the damper 15.

A portion of this air passes through the line 75 and is throttled to a lower pressure by means of the constriction 76. The air then passes through the line 77 into the bladder damper 15. In order to maintain the discharge through the outlet of the unit substantially at a constant volumetric value, a suitable pressure-responsive valve is utilized to vary the air pressure in the bladder damper 15. For this purpose the valve 80 is provided.

This venting action is achieved by connecting the line 78 with the line 77 permitting air to be vented from the bladder damper 15 into the first chamber 81 of the pressure-regulating valve 80. This first chamber 81, as previously mentioned, is in communication with the cylindrical chamber 82, however, the degree of connection is varied by the movement of the piston 87 which is varied in response to pressure differences existing in the portion 88 of the chamber 82. The pressure changes in plenum chamber 13 are reflected in the portion 88 of the cylindrical chamber 82 because the first portion 88 is placed in communication with the plenum chamber 13 by means of the line 79. A fixed amount of air will always pass through the orifice 86, however, the amount of air passing through the orifice 85 is varied with the change of area of the orifice 85 as affected by the motion of the piston 87 relative thereto. The air passes into the second portion 89 of the cylindrical chamber 82 and is discharged therefrom through the exhaust port 90.

By the above-described control system the pressure within the chamber 40 shown in FIGURE 2 is varied in response to the changes in pressure in the plenums 13 and 13'. By this particular means a constant volumetric discharge is passed through the outlet of the unit 2 into the area to be treated. This is achieved by the previously described action of the bladder 50. The upper portion of the bladder which extends into the plenums 13 and 13' is urged against the walls 45 and 46. As the air passes through the slot defined by the bladder damper 15 and the edges of the walls 10 and 10', the air is suitably expanded and the pressure in the lower portion of the bladder 50 is at a level higher than the air being expanded. As a result, the lower portion of the bladder 50 is expanded, cooperating with the edges of the walls 10 and 10' to regulate the passage of air from the plenum chambers 13 and 13'. In the event that the pressure within the plenum chambers decreases or increases this change in pressure will be reflected in the new location of the piston 87 in the pressure-regulating valve 80 to vary the size of the orifice 85 which controls the pressure existing within the control fluid chamber 40 of the bladder damper. This determines the amount of inflation occurring in the bladder 50 and determines the amount of air passing through the outlet of the unit in such a manner as to maintain a constant volumetric discharge.

Referring to FIGURE 3 it is noted that the bladder damper is further supplied with air from the plenum chamber through the line 95. The passage of air through this line is controlled by a valve 96 operatively associated with the thermostatic element 97 which reflects the temperature of the air in the area to be treated. By this means the action of the pressure-regulating valve 80 is overridden in a manner so that the unit has its constant volumetric discharge modified in response to temperature conditions within the area to be treated.

During initial installation of a unit of the type described, the volume of air introduced into the area to be treated may be fixed at various levels by suitable adjustment of the calibrating members 92, 92' which extend from the pressure-regulating valve 80. Member 92, as can be seen in FIGURE 3, relocates one of the reaction points of the spring 91 which will determine the location of the piston 87 at a predetermined pressure within the first portion 88 of the cylindrical chamber 82 while member 92' serves as a stop for the piston. These members serve to extend the range of usefulness of the control.

The present invention envisions a self-powered bladder damper control for units utilized to air condition the interior zones of buildings. The unit is inexpensive because of its self-powered characteristics and its inexpensive construction. Because of these features the unit is more versatile than units heretofore employed and more satisfactory in operation because of its compensating features in response to load conditions within the area to be treated.

While we have described a preferred embodiment of the invention it will be understood that the invention is not limited thereto since it may be otherwise embodied within the scope of the attached claims.

We claim:
1. In an air distributing unit for discharging conditioned air into an area to be treated, the combination of a plenum chamber, means for supplying air at a substantially predetermined pressure to said plenum chamber, means defining an outlet from said plenum chamber into the area to be treated, a damper arrangement associated with said outlet, said damper arrangement including a control chamber, a bladder member enveloping at least a portion of the wall of the control chamber adjacent the outlet, means for supplying a pressure less than plenum chamber pressure to the control chamber, means for supplying air from the control chamber to the space between the bladder member and the wall of the control chamber and means responsive to variation in a predetermined air pressure to vary control chamber pressure to actuate the damper arrangement.

2. An air distributing unit according to claim 1 in which the means for supplying a pressure less than plenum chamber pressure to the control chamber comprises a line extending from a source of pressure substantially equal to the plenum chamber pressure, said line having a constriction therein, said line being operatively associated with the control chamber.

3. An air distributing unit according tto claim 2 in which the means to vary control chamber pressure includes a valve having a variable orifice responsive to the source of pressure substantially equal to the plenum pressure.

4. An air distributing unit according to claim 2 including temperature-responsive means in the area to be treated and means for supplying substantially plenum chamber pressure into the control chamber, said temperature-responsive means regulating said means for supplying substantially plenum chamber pressure to the control chamber for varying the volumetric discharge through the outlet.

5. An air distributing unit according to claim 1 including means for varying the volumetric discharge through the outlet in response to temperature conditions within the area to be treated.

6. In an air distributing unit for discharging conditioned air into an area to be treated, the combination of a plenum chamber, means for supplying air at a substantially predetermined pressure to the plenum chamber, means defining a longitudinal slot-like outlet in said plenum chamber, said outlet defining means including a wall of the chamber defining one longitudinal peripheral portion of the slot and a bladder damper defining the opposite longitudinal peripheral portion of the slot, the bladder damper including a control fluid chamber, a planar member forming a wall of said control fluid chamber extending from within the plenum chamber to a point on the discharge side of the longitudinal slot discharge outlet, and a flexible sheet covering said planar member, at least one opening in the planar member placing the area between the flexible sheet and the planar member in communication with the control fluid chamber so that pressure in said control fluid chamber is exerted against said sheet to urge said sheet into cooperation with the longitudinal peripheral portion of the longitudinal slot-like discharge outlet to regulate the air being discharged from the plenum, means for supplying a pressure less than the plenum pressure to the control fluid chamber, and means for regulating pressure in the control fluid chamber in response to plenum chamber pressure to maintain a substantially constant volumetric discharge through said outlet.

7. In a method of regulating the discharge of air from an air conditioning unit including a plenum chamber having an outlet and a control arrangement including a control chamber and a bladder member at least partially enveloping the control chamber, the steps which consist in supplying air to the plenum chamber at a substantially predetermined pressure, supplying air to the control chamber at a substantially predetermined pressure less than the pressure within the plenum chamber, supplying air from the control chamber to the space between the bladder member and a wall of the control chamber, and varying the air pressure within the control chamber responsive to variation in supply air pressure to actuate the bladder member to maintain a substantially constant volumetric discharge through the outlet.

References Cited in the file of this patent

UNITED STATES PATENTS

| | | |
|---|---|---|
| 2,087,037 | McCarthy | Jan. 13, 1937 |
| 2,637,946 | Parks | May 12, 1953 |
| 2,793,812 | McDonald | May 28, 1957 |
| 2,828,076 | Donahue | Mar. 25, 1958 |